United States Patent
Raynor (10) Patent No.: US 7,554,170 B2
(45) Date of Patent: Jun. 30, 2009

(54) VARIABLY RESPONSIVE PHOTOSENSOR

(75) Inventor: Jeffrey Raynor, Edinburgh (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 0 days.

(21) Appl. No.: 11/750,007

(22) Filed: May 17, 2007

(65) Prior Publication Data

US 2007/0284507 A1 Dec. 13, 2007

(30) Foreign Application Priority Data

May 17, 2006 (EP) .................................. 06252571

(51) Int. Cl.
| | |
|---|---|
| H01L 31/00 | (2006.01) |
| H01L 27/15 | (2006.01) |
| H01L 29/26 | (2006.01) |
| H01L 31/12 | (2006.01) |
| H01L 33/00 | (2006.01) |
| H01L 29/16 | (2006.01) |
| H01L 29/161 | (2006.01) |
| H01L 31/153 | (2006.01) |
| H01L 29/417 | (2006.01) |
| H01L 29/74 | (2006.01) |
| H01L 31/111 | (2006.01) |
| H01L 31/109 | (2006.01) |

(52) U.S. Cl. ........................... 257/444; 257/80; 257/82; 257/83; 257/84; 257/113; 257/114; 257/115; 257/187; 257/257; 257/258; 257/290; 257/291; 257/292; 257/293; 257/294; 257/440; 257/451; 257/461; 257/462; 257/463; 257/464; 257/465; 257/E25.032; 257/E27.133

(58) Field of Classification Search ................... 257/80, 257/82–84, 113–115, 187, 257–258, 290–294, 257/440, 444, 451, 461–465

See application file for complete search history.

(56) References Cited

U.S. PATENT DOCUMENTS

| | | | | |
|---|---|---|---|---|
| 3,700,961 | A  * | 10/1972 | Fletcher et al. | 327/515 |
| 6,124,606 | A  * | 9/2000  | den Boer et al. | 257/291 |
| 6,448,104 | B1 * | 9/2002  | Watanabe | 438/60 |
| 6,642,562 | B2 * | 11/2003 | Watanabe | 257/292 |
| 6,756,616 | B2 * | 6/2004  | Rhodes | 257/291 |
| 6,815,743 | B2 * | 11/2004 | Rhodes | 257/292 |
| 6,858,460 | B2 * | 2/2005  | Rhodes et al. | 438/60 |
| 7,282,382 | B2 * | 10/2007 | Rieve et al. | 438/48 |

OTHER PUBLICATIONS

Patent Abstracts of Japan, vol. 017, No. 646, Nov. 30, 1993 & JP 05207376, Olympus Optical Co. Ltd., Aug. 13, 1993.

* cited by examiner

*Primary Examiner*—Ida M Soward
(74) *Attorney, Agent, or Firm*—Lisa K. Jorgenson; Allen, Dyer, Doppelt, Milbrath & Gilchrist, P.A.

(57) ABSTRACT

A photosensor includes a plurality of photosensitive regions including a first photosensitive region connected to a first voltage reference, and at least one additional photosensitive region. A signal collector is connected to the first photosensitive region. At least one switching device is for switching the at least one additional photosensitive region between the first voltage reference and a second voltage reference that is less than the first voltage reference, and for reversibly connecting the at least one additional photosensitive region to the signal collector so that the photosensor is variably responsive to different light levels.

20 Claims, 6 Drawing Sheets

| LIGHT LEVEL | CAPACITANCE | SENSITIVITY | ACTIVE REGIONS | HL1 | LH1 | HL2 | LH2 | HL3 | LH3 |
|---|---|---|---|---|---|---|---|---|---|
| HIGH | HIGH | LOW | 1,2,3,4 | 1 | 0 | 1 | 0 | 1 | 0 |
| MEDIUM HIGH | MEDIUM HIGH | MEDIUM LOW | 1,3,4 | 0 | 1 | 1 | 0 | 1 | 0 |
| MEDIUM LOW | MEDIUM LOW | MEDIUM HIGH | 1,4 | 0 | 1 | 0 | 1 | 1 | 0 |
| LOW | LOW | HIGH | 1 | 0 | 1 | 0 | 1 | 0 | 1 |

Figure 1:
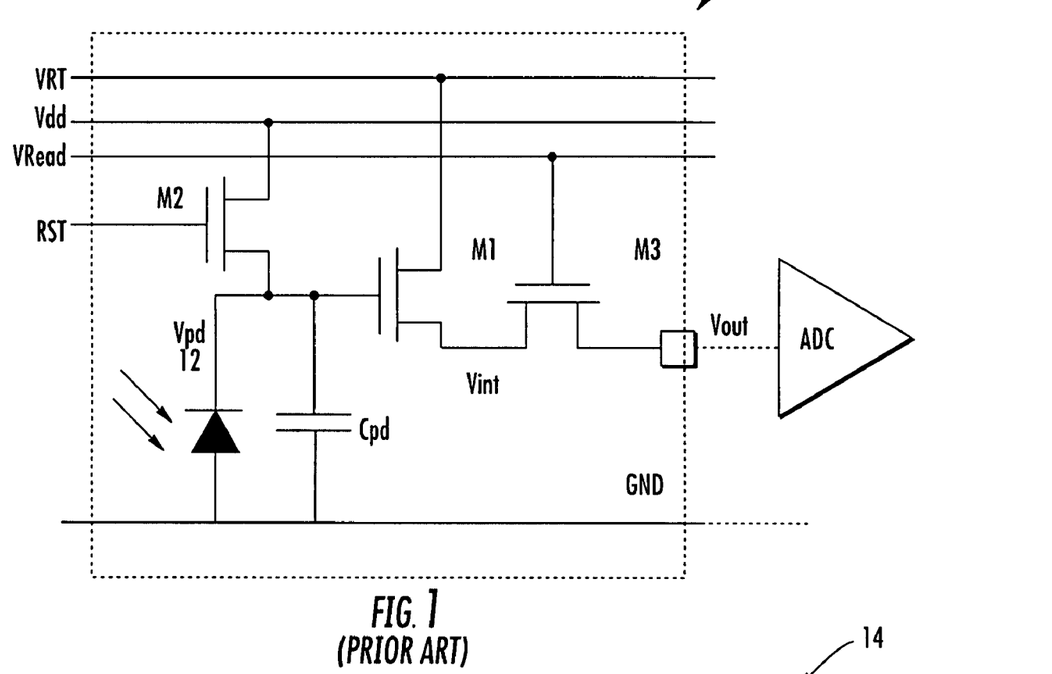
FIG. 1 is a circuit diagram of a conventional three transistor (3T) photosensor according to the prior art.

TABLE 1 though the photosensor's capacitance increases as well. The net effect of this arrangement is that the photosensor's capacitance is increased at the same rate as the increase in photogenerated charge. Thus, the voltage swing of photosensor 10 remains constant regardless of the change in the light-sensitive area thereof.

VARIABLY RESPONSIVE PHOTOSENSOR

FIELD OF THE INVENTION

The present invention relates to photosensors, and more particularly, to a photosensor in which its response may be varied in accordance with different lighting conditions.

BACKGROUND OF THE INVENTION

It is often desirable for a photosensor array to contain at least one photosensor capable of operating under a variety of different lighting conditions (e.g., high light levels) and poorly lit conditions (e.g., low light levels). This feature is typically provided by changing the exposure time of the photosensor. For example, under bright lighting conditions, the exposure time of the photosensor is reduced to prevent the photosensor from saturating.

Figure 2:
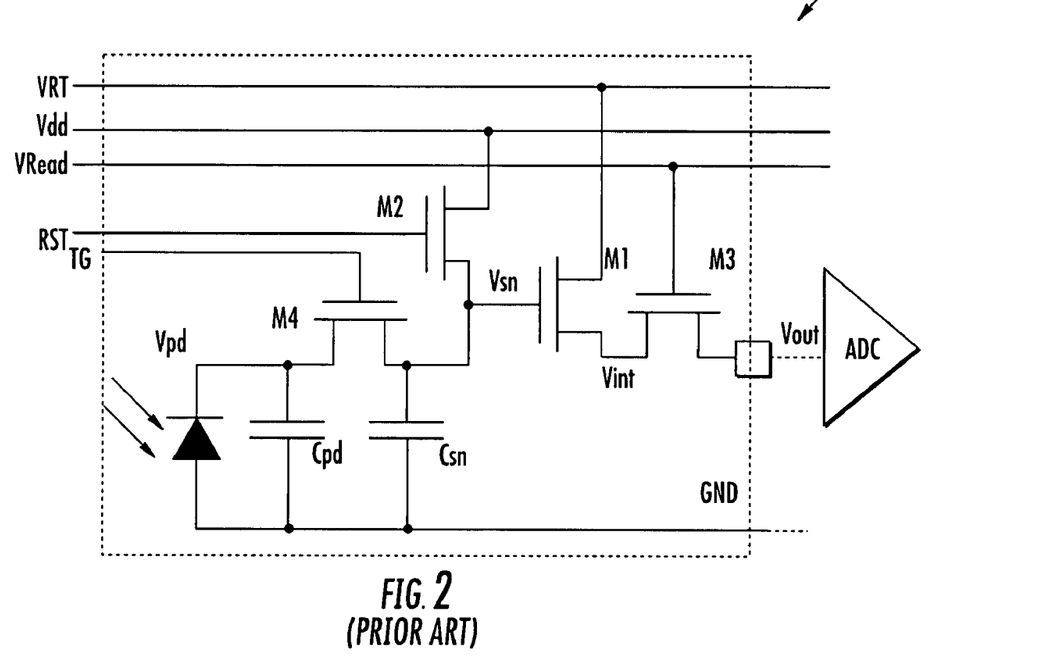
FIG. 2 is a circuit diagram of a conventional four transistor (4T) photosensor according to the prior art.

Since the present invention relates to the response of a photosensor under different lighting conditions, it is useful at this point to briefly review a number of the operating characteristics of photosensors in reference to FIGS. 1 and 2.

The full well capacity of a photosensor array refers to the total amount of charge that can be stored in any one of its photosensors before overflowing into adjoining photosensors. Accordingly, the full well capacity of a photosensor array is dependent upon the physical size of its photosensors.

Dynamic range is defined as the maximum signal strength achievable by a photosensor array divided by the noise in the array. The maximum achievable signal strength by a photosensor array is determined by the full well capacity of the array. The noise in the photosensor array is the sum of dark and read noise components. Accordingly, the dynamic range of a photosensor array can be described by equation (1) below.

$$\text{Dynamic Range} = \frac{\text{Full well capacity}}{\text{Dark Noise} + \text{Read Noise}} \quad (1)$$

Thus, one way of increasing the dynamic range of a photosensor array is to increase its full well capacity.

Responsivity is a measure of the effectiveness of a photosensor in converting incident electromagnetic radiation into electrical current or voltage, and is inversely related to the capacitance of the photosensor.

There are two main sources of noise in a photosensor array, namely photon shot noise and read noise.

Photon shot noise results from natural fluctuations in the number of photons detected by a photosensor, and is caused by the quantum statistical nature of photon emission and detection. Thus, photon shot noise imposes a fundamental limit on the responsivity of a photosensor array insofar as it determines the minimum noise level achievable therein.

Photon shot noise is governed by Poisson statistics and is described by the square root of the flux (F) of radiation incident on the photosensor (e.g., 1M photogenerated electrons corresponds with a photon shot noise of $\sqrt{10^6}$, or $10^3$, and a signal to noise ratio (SNR) of $10^3$).

From the above, it can be seen that increasing flux density (F) reduces the relative fraction of photon shot noise. However, as will be recalled, the full well capacity of a photosensor array provides an upper limit on the number of photons that can be integrated in its photosensors. Thus, any attempt to increase the flux density of the radiation incident on a photosensor and the detection thereof (to reduce the relative effect of photon shot noise) needs to be accompanied by an increase in the full well capacity of the photosensor array. This is typically achieved by including a large storage capacitor in each photosensor.

However, having a large full well capacity can present problems at low light levels. In particular, since the voltage output (V) of a photosensor is inversely related to its capacitance (C) (i.e., V=Q/C), the inclusion of a large capacitance in a photosensor reduces the output voltage swing from the photosensor.

Read noise is a combination of system noise components inherent in the conversion of photogenerated charge carriers into a measurable signal; processing of the resulting signal; and analog-to-digital (A/D) conversion thereof.

Thus, read noise determines the lower detection limit of a photosensor. Unfortunately, one of the major components of read noise is reset noise, which depends on the capacitance of the photosensor. Accordingly, any attempt to reduce the read noise of a photosensor (by reducing its full well capacity) conflicts with increasing dynamic range and reducing photon shot noise.

U.S. Pat. No. 5,296,698 describes a photosensing device that uses the "varicap" effect to vary the response of a (single) photodiode by changing the voltage applied across its PN junction. However, the photosensing device in U.S. Pat. No. 5,296,698 is a lateral device, which is not suitable for use in photosensor arrays.

Referring to FIG. 1, in a 3T photosensor 10, photogenerated charge is collected by photodiode 12 and converted to a voltage (Vpd) on the gate of a sense transistor M1. Increasing (or decreasing) the light-sensitive area of the photosensor 10 increases (or decreases) the photogenerated charge collected therein, and the photosensor's capacitance at the same rate. Hence, the voltage swing in a 3T photosensor 10 remains constant.

Referring now to FIG. 2, a 4T photosensor 14 separates the photocharge collection and sensing areas. In particular, the 4T photosensor 14 relies on a charge transfer from the charge collection capacitor Cpd to the sensing capacitor Csn. While this approach works well for small (<5 μm) photosensors, it is not as effective for larger (≧30 μm) photosensors.

U.S. Pat. No. 6,801,258 describes a photosensor array that is particularly suited for detection at low light levels. Under these conditions, the dominant source of noise in the photosensor array is read noise. However, averaging N signals from the array results in a $\sqrt{N}$ reduction of its noise.

In summary, prior art photosensors are characterized by having either a low capacitance or a high capacitance. Photosensors with a low capacitance typically have high sensitivity but increased photon shot noise. In contrast, photosensors with a high capacitance typically have low photon shot noise but low sensitivity. However, the lower sensitivity of such photosensors means that read noise provides a more significant contribution to the overall noise of the photosensor. Consequently, the relative noise level of the photosensor is increased.

SUMMARY OF THE INVENTION

In view of the forgoing background, an object of the invention is to provide a variably responsive photosensor.

This and other objects, advantages and features in accordance with the invention are provided by a photosensor comprising a plurality of photosensitive regions, with a first one of the photosensitive regions being connectable to a first potential source and signal collection means or signal collector.

The photosensor may further comprise switching means or a switch adapted for switching the remaining photosensitive regions between the first potential and a second potential that is lower than the first potential, and for reversibly connecting the remaining photosensitive regions to the signal collection means so that the photosensor is variably responsive to different light levels.

The second potential may be ground. The switching means may be operable such that under high light levels the remaining photosensitive regions are connected to the first potential and the signal collection means so that the signal collected at the signal collection means is from all of the photosensitive regions.

The switching means may be operable so that under low light levels all of the remaining photosensitive regions are connected to the second potential and disconnected from the signal collection means so that the signal collected at the signal collection means is substantially from the first photosensitive region.

The switching means may also be operable so that at intermediate light levels between the high light levels and low light levels some of the remaining photosensitive regions are connected to the second potential and disconnected from the signal collection means so that the signal collected at the signal collection means is from the first photosensitive region and from the remaining photosensitive regions connected to the signal collection means.

The photosensitive regions may comprise N well and P-type epitaxial junctions. Alternatively, the photosensitive regions may comprise P well and N-type epitaxial junctions.

The photosensitive regions may comprise N+ and P– junctions. Alternatively, the photosensitive regions may comprise P– and N+ junctions. The switching means may comprise an NMOS transistor. Alternatively, the switching means may comprise a PMOS transistor.

A second aspect of the invention is directed to a method of varying the response of a photosensor in accordance with incident light levels comprising the steps of dividing the photosensing area of a photosensor into a plurality of photosensitive regions, connecting a first one of the photosensitive regions to a first potential and to signal collection means of the photosensor, and connecting the remaining photosensitive regions to the first potential and to the signal collection means in the event of the incident light being at a high light level. The method may further comprise disconnecting the remaining photosensitive regions from the signal collection means and the first potential, and connecting the remaining photosensitive regions to a second potential that is lower than the first potential in the event of the incident light being at a low light level.

A third aspect of the invention is directed to an optical mouse comprising data transmission means or a transmitter, movement controlling means or a controller and a variably responsive photosensor as discussed above.

A fourth aspect of the invention is directed to a digital camera comprising focusing means or a focuser, data processing means or data processor, and a variably responsive photosensor as discussed above.

A fifth aspect of the invention is directed to an x-ray sensor comprising a variably responsive photosensor as discussed above.

For purposes of discussion, the photosensor will be referred to a variable response photosensor. The variable response photosensor may comprise at least one switchable photosensitive site per photosensor. This allows a single photosensor to operate under either high light levels (with low photon-shot noise) or low light levels (with low readout-noise).

The underlying principle of the variable response photosensor is the splitting of the large photosensor into a plurality of smaller photosensitive regions. In particular, the variable response photosensor may be designed such that when operating under high light levels all the photosensitive regions collect photocharge, but under low light levels only some of the photosensitive regions collect photocharge.

The variable response photosensor may connect unused photosensitive regions to a lower potential (e.g., ground). This causes photogenerated electrons to be preferentially drawn to the positively charged collection node. In effect, this causes the reduction in collection area (resulting from the use of a smaller number of photosensitive regions) to be less than the coinciding reduction in photosensor capacitance.

In general, the variable response photosensor may increase the signal generated in a photosensor by a factor of M. In other words, the variable response photosensor may enable the SNR of the photosensor to increase by M.

DETAILED DESCRIPTION OF THE PREFERRED EMBODIMENTS

Figure 9:
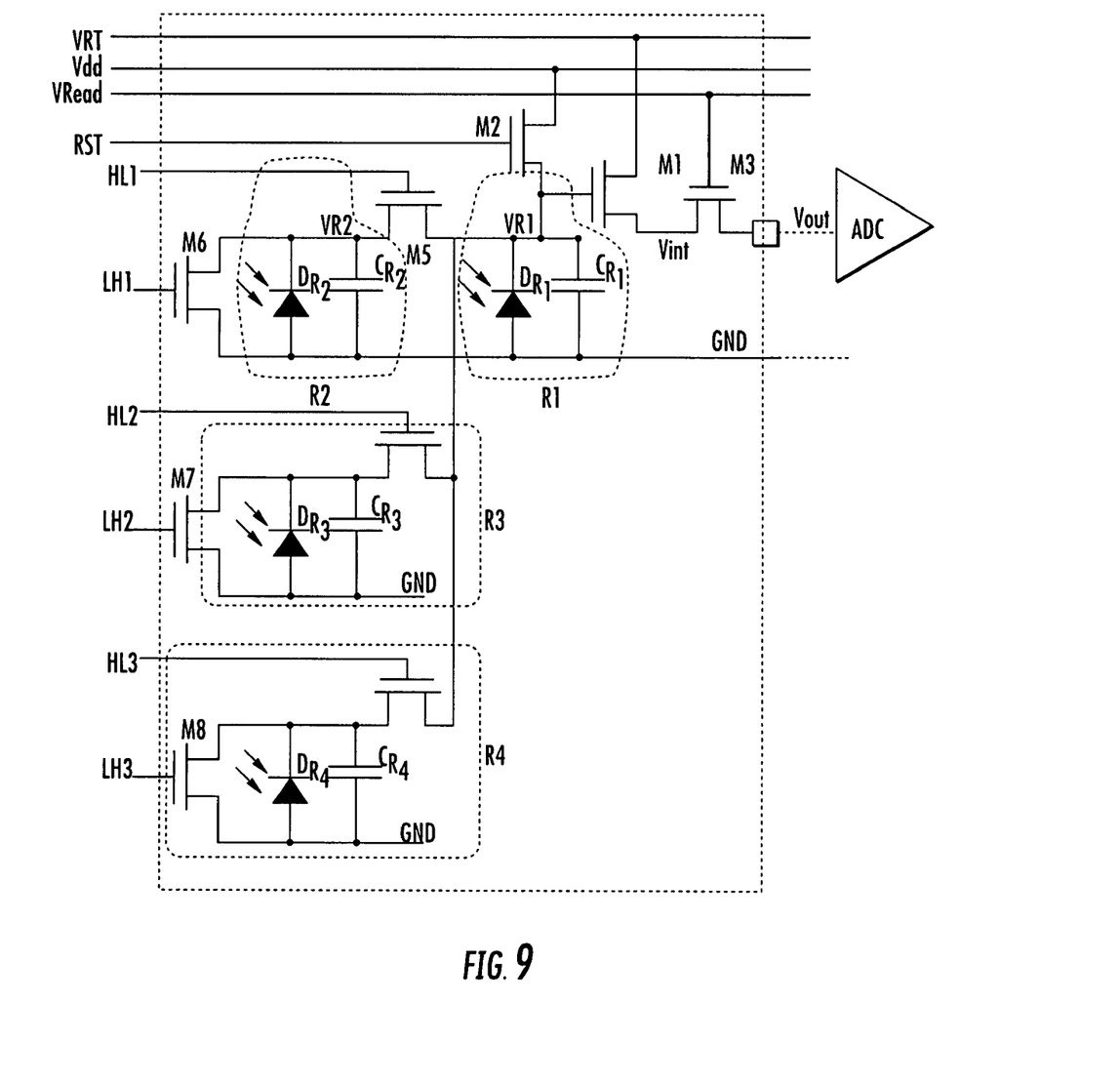
FIG. 9 is a circuit diagram of a second embodiment of the variable response photosensor comprising four different photosensitive regions.
Figure 10:
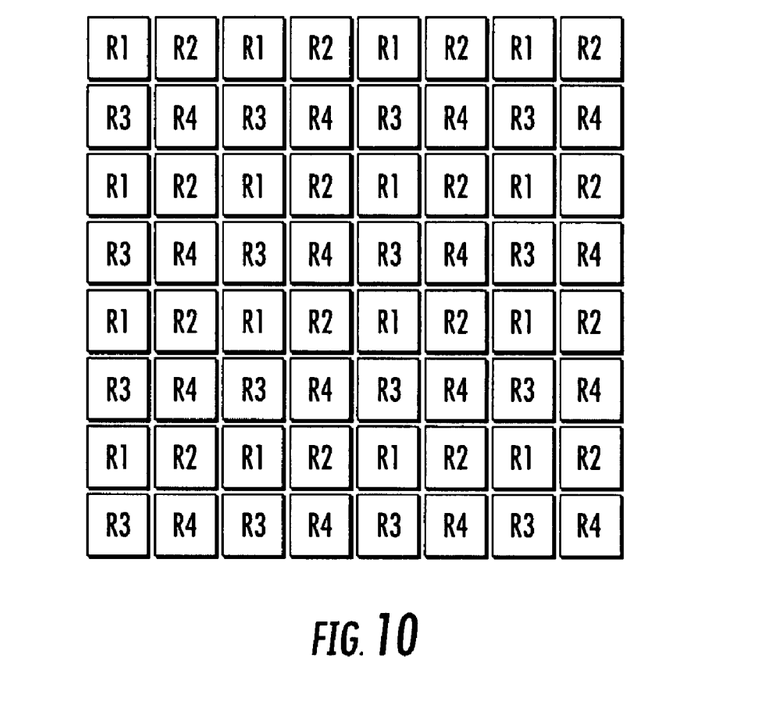
FIG. 10 is a plan view (layout view) of a pixel comprising the second embodiment of the variable response photosensors of FIG. 9.

TABLE 1 lists the operating parameters of the second embodiment of the variable response photosensor of FIGS. 9 and 10.

TABLE 1

| Light Level | Capacitance | Sensitivity | Active Regions | HL1 | LH1 | HL2 | LH2 | HL3 | LH3 |
|---|---|---|---|---|---|---|---|---|---|
| High | High | Low | 1, 2, 3, 4 | 1 | 0 | 1 | 0 | 1 | 0 |
| Medium | Medium | Medium | 1, 3, 4 | 0 | 1 | 1 | 0 | 1 | 0 |
| High | High | Low | | | | | | | |
| Medium | Medium | Medium | 1, 4 | 0 | 1 | 0 | 1 | 1 | 0 |
| Low | Low | High | | | | | | | |
| Low | Low | High | 1 | 0 | 1 | 0 | 1 | 0 | 1 |

The following description will provide a brief overview of the concept underlying the variable response photosensor. This will be followed by a more detailed explanation of a first embodiment of the variable response photosensor comprising only two photosensitive regions. In particular, the discussion will focus on the structure of the first embodiment of the variable response photosensor and its operation with reference to the electric fields developed therein. The detailed description will finish with a description of a second embodiment of the variable response photosensor comprising multiple photosensitive regions.

The following descriptions are based on an embodiment comprising a P-type semiconductor substrate with N-type semiconductor implants. However, it will be understood that this embodiment is used for exemplary purposes only and should in no way be interpreted as limiting the present invention to this embodiment. In particular, it will be understood that the present invention could be equally implemented with a photosensor comprising an N-type semiconductor substrate and P-type semiconductor implants.

The underlying principle of the variable response photosensor is the splitting of a large photosensor into a plurality of smaller photosensitive regions. In particular, the variable response photosensor is designed such that when operating under high light levels all the photosensitive regions collect photocharge, but under low light levels only some of the photosensitive regions collect photocharge.

When a small number of photosensitive regions are used to collect photocharge (i.e., under low lighting conditions), the light-collection area of the photosensor is reduced. Furthermore, as will be recalled from the background to the invention, the full well capacity of a photosensor array is dependent on the physical size of its photosensors. Accordingly, the use of a smaller number of photosensitive regions to collect photocharge also reduces the capacitance of the photosensor. In particular, the reduction in the photosensor's capacitance is approximately matched by the reduction in the number of photoelectrons collected therein.

The capacitance of the entire body of photosensitive regions in the variable response photosensor is denoted by $C_{all}$. Further, the number of photons incident on the variable response photosensor is denoted by $N_{e\_photo}$, and the charge of an individual photogenerated electron is denoted by e. In this case, if all the photosensitive regions in the variable response photosensor are used to collect photocharges (i.e., under high light levels), the voltage swing of the variable response photosensor ($\Delta V_{pd1}$) can be described by equation (2) below.

$$\Delta V_{pd1} = \frac{N_{e\_photo} \cdot e}{C_{all}} \quad (2)$$

Similarly, if only half of the photosensitive regions in the variable response photosensor are used to collect photocharges (i.e., under low light levels) the voltage swing of the variable response photosensor ($\Delta V_{pd2}$) can be described by equation (3) below.

$$\Delta V_{pd2} = \frac{N_{e\_photo} \cdot 1/2e}{C_{all} \cdot 1/2} = \frac{N_{e\_photo} \cdot e}{C_{all}} = \Delta V_{pd1} \quad (3)$$

Hence, the voltage swings under different lighting conditions are the same and there is no apparent benefit in reducing the number of photosensitive regions in the variable response photosensor.

To overcome this problem, the variable response photosensor connects unused photosensitive regions to a lower potential (e.g., ground). This causes photogenerated electrons to be preferentially drawn to the positively charged collection node. In effect, this causes the reduction in collection area (resulting from the use of a smaller number of photosensitive regions) to be less than the coinciding reduction in photosensor capacitance.

In other words, if $Q_{part}$ and $Q_{full}$ are respectively used to denote the photocharge collected by a portion of and the entirety of the variable response photosensor, and $C_{part}$ and $C_{full}$ are used to respectively denote the capacitance of a portion of, and the entirety of the variable response photosensor, then the connection of unused photosensitive regions in the photosensor to a lower potential results in equation (4) below.

$$\frac{Q_{part}}{Q_{full}} > \frac{C_{part}}{C_{full}} \quad (4)$$

Figure 3:
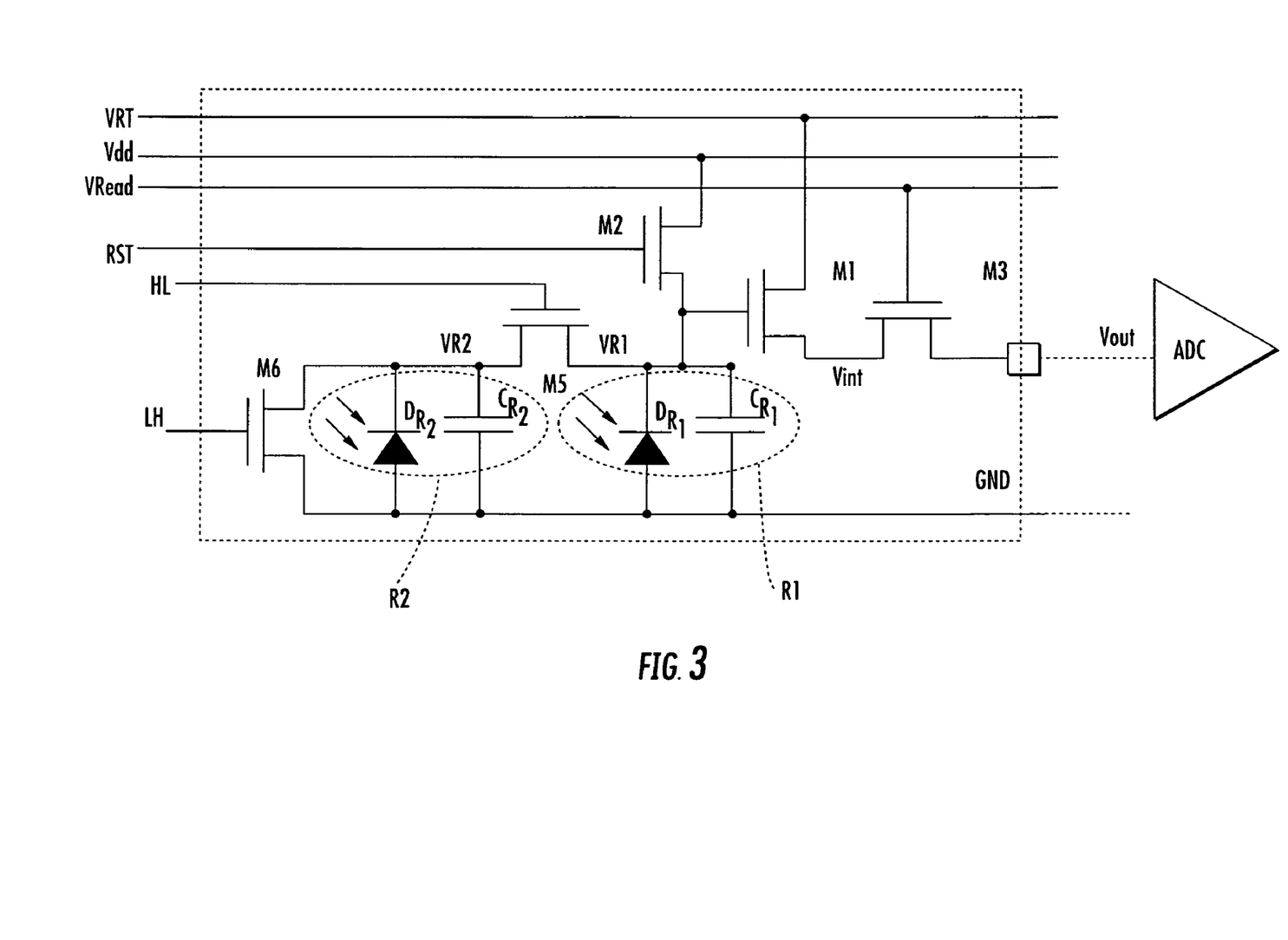
FIG. 3 is a circuit diagram of a first embodiment of the variable response photosensor according to the present invention.

Referring to FIG. 3, a variable response photosensor 20 comprises a first photosensitive region (R1) represented by the diode $D_{R1}$ and its intrinsic capacitance $C_{R1}$ and a second photosensitive region (R2) represented by diode $D_{R2}$ and capacitor $C_{R2}$. Transistor M5 is used to separate the first and second photosensitive regions (R1, R2) and transistor M6 is used to ground any unwanted photosensitive regions. The sense node of the variable response photosensor 20 is the gate of transistor M1.

At high light levels, the voltage of a first line (HL) is high (e.g., 1.8V or 3.3V) which turns on transistor M5 and the voltage of a second line (LH) is low (i.e., 0V) which turns off transistor M6. As transistor M5 is turned on, the voltage of the first and second photosensitive regions (R1, R2) are equal ($V_{R1}=V_{R2}$) and the net capacitance of the sense node (M1) is $C_{R1}+C_{R2}$. Furthermore, a photocharge is generated and collected from the first and second diodes ($D_{R1}$ and $D_{R2}$).

At low light levels, the voltage of the first line (HL) is low (i.e., 0V) which turns off transistor M5. Similarly, the voltage of the second line (LH) is high (e.g., 1.8V or 3.3V) which turns on transistor M6. As transistor M5 is turned off, the capacitance of the sense node is $C_{R1}$ only and any photogenerated charge is collected from diode $D_{R1}$ only.

Figure 4:
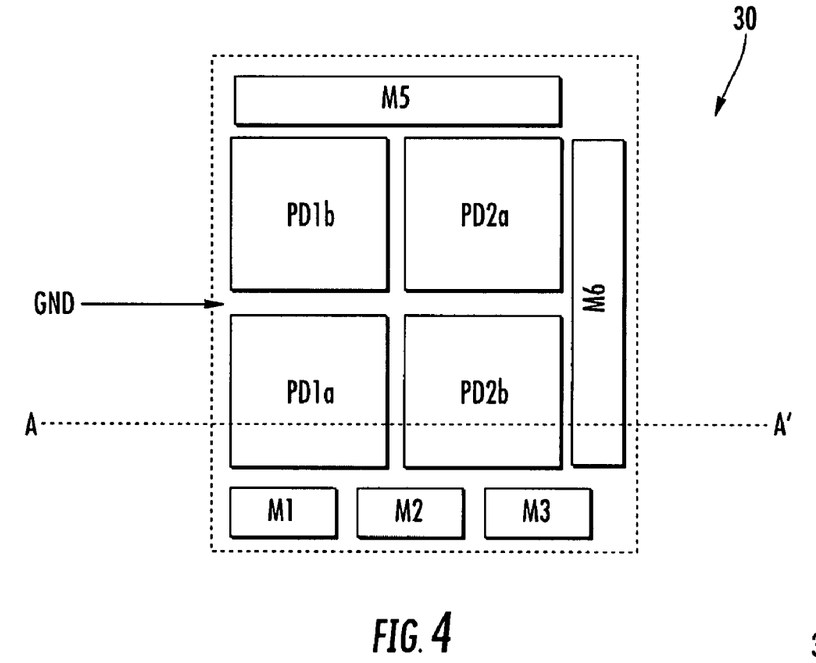
FIG. 4 is a plan view of a pixel employing a first embodiment of the variable response photosensor shown in FIG. 3.
Figure 5:
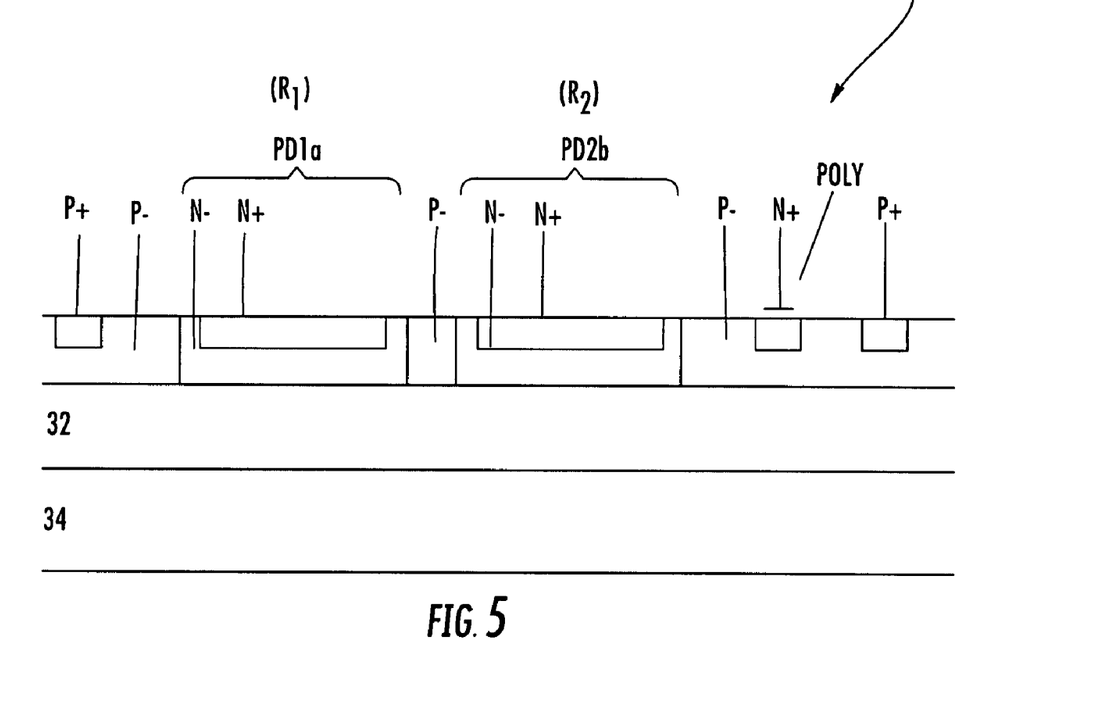
FIG. 5 is a cross-section through the pixel of FIG. 4 along the line A-A'.

A first embodiment of the variable response photosensor comprising two photosensitive regions will now be discussed. In terms of structural aspects, the isolation, at low light levels, of the diode and capacitance of the second photosensitive region (i.e., $D_{p2}/C_{pd2}$) from the sense node (M1) by the transistor M6 is best explained by examining an exemplary pixel employing the variable response photosensor in FIG. 4 whose internal semiconductor structure is shown in FIG. 5. It will be noted that the position and size of transistors M1 to M6 depicted in FIG. 4 are provided for illustration purposes only. In particular, the actual size and layout of the transistors may be altered to satisfy individual system performance requirements (e.g., pixel size, noise, speed, power consumption, etc.).

Referring to FIG. 4, let a pixel 30 comprise a first variable response photosensor ($PD_1$) and a second variable response photosensor ($PD_2$). Let the first variable response photosensor ($PD_1$) be divided into two photosensitive regions ($PD_{1a}$ and $PD_{1b}$). Similarly let the second variable response photosensor ($PD_2$) be divided into two photosensitive regions ($PD_{2a}$ and $PD_{2b}$). It will be understood that each of photosensitive regions $PD_{1a}$ and $PD_{2a}$ correspond to photosensitive region R1 in FIG. 3. Similarly, it will be understood that each of photosensitive regions $PD_{1b}$ and $PD_{2b}$ correspond with photosensitive region R2 in FIG. 3. Accordingly, each of the photosensitive regions is arranged so that no R2-type photosensitive region is adjacent to another and so that no R1-type photosensitive region is adjacent to another.

To simplify the figures, the (typically metal) connections between the regions ($PD_{1a}$, $PD_{1b}$, $PD_{2a}$ and $PD_{2b}$) and the connections (typically metal) between the variable response photosensors ($PD_1$, $PD_2$) are not shown. The number of photosensitive regions in either the first or second variable response photosensors ($PD_1$, $PD_2$) can be greater than or equal to two. In fact, as will be shown below, it is advantageous to have a large number of photosensitive regions in a given variable response photosensor.

Referring to FIG. 5, the photosensitive regions (R1 and R2) $PD_{1a}$ and $PD_{2b}$ are formed by N− (N Well) P− epitaxial junctions. N Well structures are preferred as they are deeper and collect more charge. Furthermore, the lower doping profile of N Well structures reduces dark current. However, N Well structures are typically less precisely implanted than other structures. In view of the practical problems with implanting N Well structures, such structures need to be manufactured larger. Consequently, if the variable response photosensor is to be used in a smaller pixel (e.g., <12 μm), it may be preferable to use N+/P− epitaxial diodes.

Returning to FIG. 5, N+ implants form the transistors (M1-M6). These structures are implanted with much greater accuracy than the afore-mentioned N Well structures. Consequently, the N+ implants (i.e., of the transistors) can be made smaller than the N Well structures of the photosensitive regions (R1 and R2) $PD_{1a}$ and $PD_{2b}$.

Preferably, epitaxial material 32 is deposited on a (P++) substrate 34. However, the epitaxial layer 32 is not essential. In particular, in the absence of the epitaxial layer 32, the photosensitive regions (R1 and R2) $PD_{1a}$ and $PD_{2b}$ could be formed from an N+/P− junction. FIG. 5 shows P− between photosensitive regions (R1 and R2) $PD_{1a}$ and $PD_{2b}$. This is a common implementation, but if epitaxial material 32 is available, it is preferred over the P-material as the lower doping of the epitaxial material 32 extends the electric field in the photosensitive regions and increases the collection area therefore.

The transistor M6 is shown to the right of the photosensitive regions (R1 and R2) $PD_{1a}$ and $PD_{2b}$. FIG. 5 shows the polysilicon gate of the transistor M6 for illustration purposes only. Whether or not this would appear in a given cross-section of a pixel would depend on the precise layout of the pixel.

P+ implants provide the electrical ground for the pixel. Typically, there will be a small implant in each pixel. For efficient operation, the distance between the P+ implants should not be greater than 100 μm (this distance is determined by the diffusion constant of silicon). For pixels that are larger than this, it is important to have a ground connection close to the source of M6. This ensures that M6 is fully turned on (signal LH is set high) during low light levels and that the ground potential is distributed to the PD2 nodes.

Having discussed the underlying structure of a photosensor array comprising the variable response photosensor, it is useful to discuss the operation of the variable response photosensor and the development of the electric fields therein. The variable response photosensor has two modes of operation: high light level operations and low light level operations. Both of these operational modes will be described in more detail below.

Figure 6:
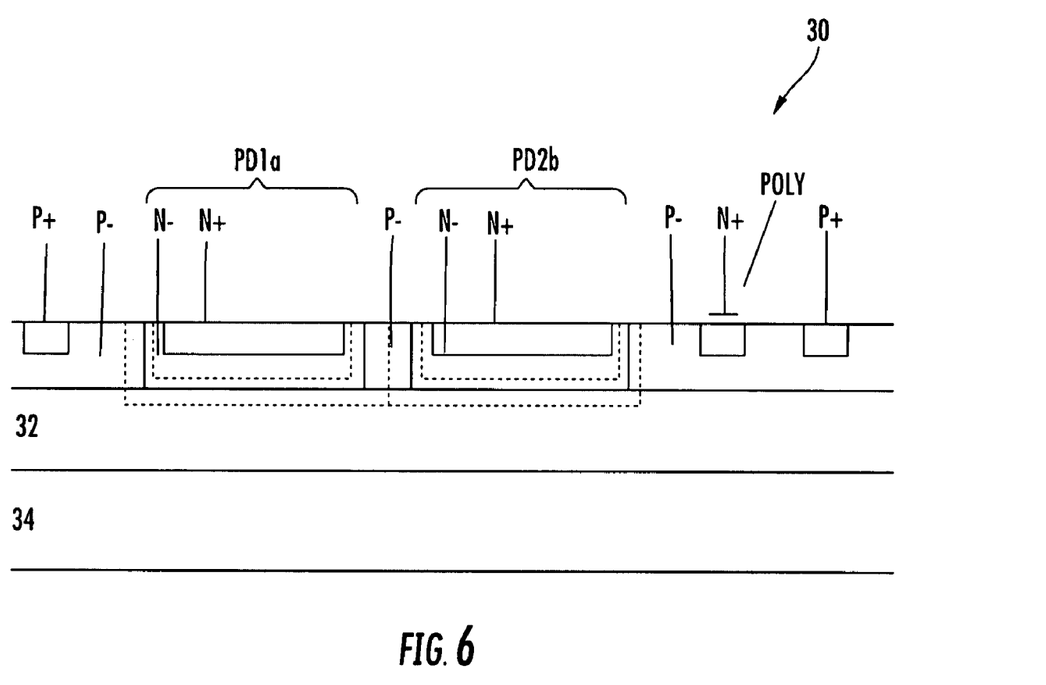
FIG. 6 is a cross-section through the pixel of FIG. 4 along the line A-A' (as shown in FIG. 5), when exposed to high light levels.

With high light levels a high capacitance is required to maximize the number of electrons that can be stored (i.e., full well capacity) and to reduce photon shot noise. Referring to FIG. 6 together with FIG. 3, as the voltage on the HL line is set high, transistor M5 is fully turned on and the two photosensitive regions (R1 and R2) $PD_{1a}$ and $PD_{2b}$ are held at similar potentials. As a result, both photosensitive regions (R1 and R2) $PD_{1a}$ and $PD_{2b}$ are reversed biased and two depletion regions α and β (associated with photosensitive regions $PD_{1a}$ and $PD_{2b}$ respectively) are produced which extend into the epitaxial layer 32.

Charge carriers generated in the photosensitive regions (R1 and R2) $PD_{1a}$ and $PD_{2b}$ by the incident light randomly move (by diffusion) through the silicon of the variable response photosensor 30 until they reach a depletion region. At this point, the electrical fields associated with the depletion region specifically draw and accelerate the movement of the charge carriers across the depletion region. This results in a photocurrent that is collected and transmitted to external circuitry.

FIG. 6 shows the depletion region α of $PD_{1a}$ touching the depletion region β of $PD_{2b}$. This represents an ideal situation, which ensures that photogenerated charges in both photosensitive regions are collected. Unfortunately, depending on the manufacturing of a pixel (e.g., design rules which increase the separation of the wells, high doping levels that reduce the electric fields associated with a depletion region, or insufficient voltage across the depletion region) it may not be possible to achieve such proximity between the depletion regions α and β.

Figure 7:
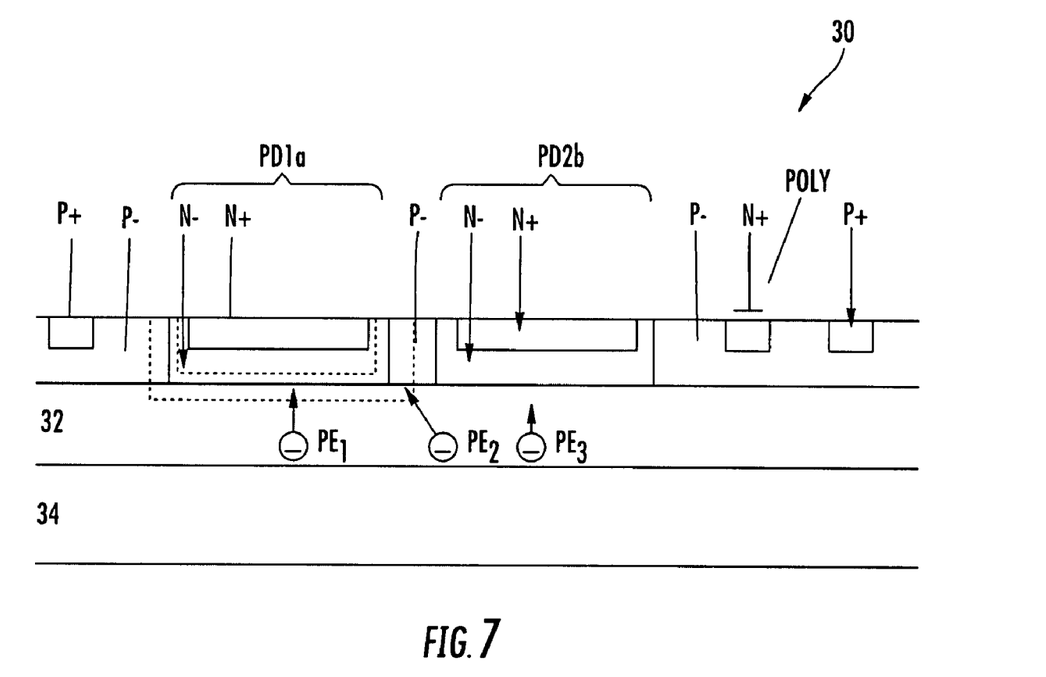
FIG. 7 is a cross-section through the pixel of FIG. 4 along the line A-A' (as shown in FIG. 5) when exposed to low light levels.

Referring to FIG. 7, under low light levels there is not enough light to saturate the variable response photosensor 30. Nonetheless, the objective remains to produce the maximum possible voltage swing from the variable response photosensor 30. As will be recalled from the earlier overview, it is not sufficient to reduce the photosensor's capacitance (by effectively reducing its photosensitive area) because the number of photons (and hence photogenerated electrons) collected is reduced proportionately. Instead, as will be recalled, the variable response photosensor overcomes this problem by connecting unused photosensitive regions to a lower (e.g., ground) potential. For example, referring to FIG. 7, photosensitive region $PD_{2b}$ is connected to a lower potential than $PD_{1a}$ and only one depletion region is formed in the variable response photosensor 30 (depletion region α around $PD_{1a}$).

To better explain the low light operation of the variable response photosensor 30 it is useful to examine the paths of three photogenerated electrons (PE1, PE2 and PE3) as shown in FIG. 7. PE3 is quite distant from depletion region α and is unlikely to be influenced by the electrical fields associated with α. Thus, PE3 will diffuse in random fashion through the silicon of the photosensor 30 and will probably end up at the ground node (P+ implant) of the photosensor 30 whereupon PE3 will be lost.

PE1 is proximal to the depletion region α. Thus, the electric field associated with α will accelerate PE1 towards the positive potential of $PD_{1a}$, from which PE1 will be collected. PE2 is not quite as close to the depletion region α as PE1, but is not as distant therefrom as PE3. Consequently, PE2 will diffuse in the silicon of the photosensor 30 and will probably reach the depletion region α whereupon it will be accelerated towards PD1a.

Figure 8:
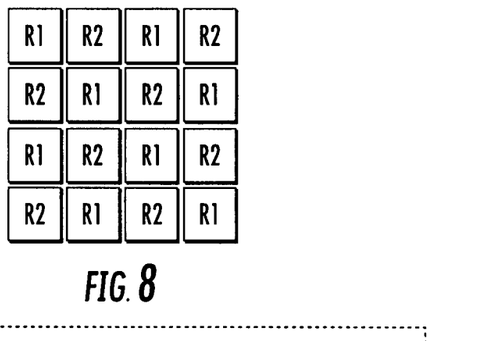
FIG. 8 is a plan view of a pixel comprising the first embodiment of the variable response photosensors according to the present invention.

From this it can be seen that the collection area of $PD_{1a}$ is, in effect, greater than its implanted (i.e., electrical/capacitive) area. This gain can be improved by increasing the number of PE2 type photoelectrons collected by minimizing the distance such photoelectrons have to diffuse in the silicon of the variable response photosensor 30. In particular, the gain in the collection area of the variable response photosensor 30 can be improved by making its collection areas (photosensitive regions) as small as possible and increasing their number, as shown in FIG. 8. The minimum size of a collection area is usually limited by design rule limitations on well size.

A downside of the variable response photosensor is that while its large number of small photosensitive regions has a similar area to a single larger photosensor, the set of small photosensitive regions have a larger side-wall capacitance than the single larger photosensor. Nonetheless, although there is an increase in the capacitance and dark-current in the variable response photosensor (compared with a conventional photosensor), the above-mentioned gain in sensitivity of the variable response photosensor more than compensates for this.

A second embodiment of the variable response photosensor comprising multiple photosensitive regions will now be discussed. The previous discussions have related to a variable response photosensor employing two types of photosensitive regions ($R_1$ and $R_2$) for use under two different lighting conditions. However, it is possible to extend the variable response photosensor, for example, to work with even lower light levels.

FIG. 9 shows a further embodiment of the variable response photosensor 40, comprising four different photosensitive regions $R_1$, $R_2$, $R_3$ and $R_4$. Referring to FIG. 9 and comparing it with the circuit diagram of FIG. 3 it can be seen that photosensitive region R1, formed by $D_{R1}$ and $C_{R1}$, is permanently connected to the sense transistor M1 and the other photosensitive regions R2, R3 and R4 are switchably connected between a lower (e.g., ground) potential and the sense transistor M1.

Referring to FIG. 10, photosensitive region R1 is disposed adjacent to photosensitive regions R2, R3 and R4 (albeit diagonally). Hence, a photogenerated electron has a maximum distance of half of the photosensitive region (R1, R2, R3 or R4) length/width to diffuse before it would encounter a collection node.

The operation of the multiple photosensitive region embodiment of the variable response photosensor 40 is illustrated in TABLE 1. In particular, if the variable response photosensor 40 is operating under bright lighting conditions (high light level) all of the photosensitive regions are connected to the sense transistor M1. As the light level falls (medium high light level) only three quarters of the photosensitive regions (e.g., R1, R3 and R4) are connected to the sense transistor M1. In the present example, it is irrelevant if photosensitive region R2 or R3 is used. However, photosensitive region R4 is preferred as it minimizes or reduces the diffusion distance for photogenerated electrons.

As the light level falls further (medium to low light level) then only half of the photosensitive regions (R1 and R4) are connected to the sense transistor M1 (photosensitive region R4 is preferred for the above-stated reasons). At the lowest light level, (low light level) only a quarter of the photosensitive regions (photosensitive region R1) are connected to the sense transistor M1. The rest of the photosensitive regions are grounded. In this case, photogenerated carriers diffuse to photosensitive region R1 and are collected and detected therein.

The above-described variably responsive photosensor is applicable to a broad range of devices including digital cameras, optical mice and X-ray sensors. It will be appreciated that those skilled in the art may use standard techniques to implement the invention in these and other ways. Alterations and modifications may be made to the above without departing from the scope of the invention.

That which is claimed:

1. A photosensor comprising:
a plurality of photosensitive regions including a first photosensitive region connected to a first voltage reference, and at least one additional photosensitive region;
a signal collector connected to said first photosensitive region; and
at least one switching device for switching said at least one additional photosensitive region between the first voltage reference and a second voltage reference that is less than the first voltage reference, and for reversibly connecting said at least one additional photosensitive region to said signal collector so that the photosensor is variably responsive to different light levels.

2. A photosensor as in claim 1 wherein the second voltage reference is ground.

3. A photosensor as in claim 1 wherein said at least one additional photosensitive region comprises a plurality of additional photosensitive regions; wherein said at least one switching device comprises a respective switching device for each additional photosensitive region, each respective switching device being operable such that under high light levels all of said plurality of additional photosensitive regions are connected to the first voltage reference and to said signal collector so that a signal collected at said signal collector is from all of said plurality of additional photosensitive regions.

4. A photosensor as in claim 1 wherein said at least one additional photosensitive region comprises a plurality of additional photosensitive regions; wherein said at least one switching device comprises a respective switching device for each additional photosensitive region, each respective switching device being operable such that under low light levels all of said plurality of additional photosensitive regions are connected to the second voltage reference and are disconnected from said signal collector so that a signal collected at said signal collector is substantially from said first photosensitive region.

5. A photosensor as in claim 1 wherein said at least one additional photosensitive region comprises a plurality of additional photosensitive regions; wherein said at least one switching device comprises a respective switching device for each additional photosensitive region, each respective switching device being operable such that under intermediate light levels between a high light level and a low light level a portion of said plurality of additional photosensitive regions are connected to the second voltage reference and are disconnected from said signal collector so that a signal collected at said signal collector is from said first photosensitive region and from the portion of said plurality of additional photosensitive regions connected to said signal collector.

6. A photosensor as in claim 1 further comprising a P-type epitaxial layer, and a plurality of N wells in said P-type epitaxial layer, with each photosensitive region being in a respective N well.

7. A photosensor as in claim 1 further comprising an N-type epitaxial layer, and a plurality of P wells in said N-type epitaxial layer, with each photosensitive region being in a respective P well.

8. A photosensor as in claim 1 wherein each photosensitive region comprises an N+/P− junction.

9. A photosensor as in claim 1 wherein each photosensitive regions comprises a P−/N+ junction.

10. A photosensor as in claim 1 wherein said at least one switching device comprises at least one NMOS transistor.

11. A photosensor as in claim 1 wherein said at least one switching device comprises at least one PMOS transistor.

12. A photosensor as in claim 1 wherein said plurality of photosensitive regions, said signal collector and said at least one switching device are configured for operating with at least one of an optical mouse, a digital camera and an x-ray sensor.

13. A photosensor comprising:
  a first photosensitive region connected to a first voltage reference;
  a signal collector connected to said first photosensitive region;
  a plurality of additional photosensitive regions; and
  a plurality of switching devices for switching said plurality of additional photosensitive regions between the first voltage reference and a second voltage reference that is less than the first voltage reference, and for reversibly connecting said plurality of additional photosensitive regions to said signal collector so that the photosensor is variably responsive to different light levels.

14. A photosensor as in claim 13 wherein the second voltage reference is ground.

15. A photosensor as in claim 13 wherein there is a respective switching device for each additional photosensitive region, with each respective switching device being operable such that under high light levels all of said plurality of additional photosensitive regions are connected to the first voltage reference and to said signal collector so that a signal collected at said signal collector is from all of said plurality of additional photosensitive regions.

16. A photosensor as in claim 13 wherein there is a respective switching device for each additional photosensitive region, with each respective switching device being operable such that under low light levels all of said plurality of additional photosensitive regions are connected to the second voltage reference and are disconnected from said signal collector so that a signal collected at said signal collector is substantially from said first photosensitive region.

17. A photosensor as in claim 13 wherein there is a respective switching device for each additional photosensitive region, with each respective switching device being operable such that under intermediate light levels between a high light level and a low light level a portion of said plurality of additional photosensitive regions are connected to the second voltage reference and are disconnected from said signal collector so that a signal collected at said signal collector is from said first photosensitive region and from the portion of said plurality of additional photosensitive regions connected to said signal collector.

18. A photosensor as in claim 13 further comprising an epitaxial layer, and a plurality of wells in said epitaxial layer, with each photosensitive region being in a respective well.

19. A photosensor as in claim 13 wherein each photosensitive region comprises either an N+/P− junction or a P−/N+ junction.

20. A photosensor as in claim 13 wherein each switching device comprises at least one transistor.

* * * * *

UNITED STATES PATENT AND TRADEMARK OFFICE
CERTIFICATE OF CORRECTION

PATENT NO. : 7,554,170 B2
APPLICATION NO. : 11/750007
DATED : June 30, 2009
INVENTOR(S) : Jeffrey Raynor Page 1 of 1

It is certified that error appears in the above-identified patent and that said Letters Patent is hereby corrected as shown below:

Column 4, Line 2      Delete: "to a"
                      Insert: -- to as a --

Column 9, Line 67     Delete: "embodiment"
                      Insert: -- embodiments --

Column 11, Line 22    Delete: "regions comprises"
Claim 9               Insert: -- region comprises --

Signed and Sealed this

Twenty-second Day of September, 2009

David J. Kappos
*Director of the United States Patent and Trademark Office*